(12) United States Patent
Koga

(10) Patent No.: US 9,846,560 B2
(45) Date of Patent: Dec. 19, 2017

(54) INFORMATION PROCESSING APPARATUS CAPABLE OF SELECTING AMONG A PLURALITY OF POWER SAVING MODES USING A SIMPLE OPERATION, AND CONTROL METHOD AND STORAGE MEDIUM THEREFOR

(71) Applicant: CANON KABUSHIKI KAISHA, Tokyo (JP)

(72) Inventor: Kazuhiro Koga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 14/289,869

(22) Filed: May 29, 2014

(65) Prior Publication Data

US 2015/0012769 A1 Jan. 8, 2015

(30) Foreign Application Priority Data

Jul. 2, 2013 (JP) .................................. 2013-138802

(51) Int. Cl.
*G06F 3/12* (2006.01)
*G06F 1/32* (2006.01)

(52) U.S. Cl.
CPC .......... *G06F 3/1286* (2013.01); *G06F 1/3287* (2013.01); *G06F 3/1221* (2013.01); *G06F 3/1229* (2013.01); *G06F 1/3284* (2013.01); *Y02B 60/1271* (2013.01)

(58) Field of Classification Search
CPC .... G06F 1/3206; G06F 3/1221; G06F 3/1229; G06F 3/1286; G06F 1/3284; G06F 1/3287
See application file for complete search history.

(56) References Cited

U.S. PATENT DOCUMENTS

| | | | | |
|---|---|---|---|---|
| 5,553,296 A | * | 9/1996 | Forrest | G06F 1/3209 713/321 |
| 5,619,412 A | * | 4/1997 | Hapka | B60R 25/04 123/179.2 |
| 5,987,613 A | * | 11/1999 | Busch | G06F 1/1616 713/300 |
| 6,829,493 B1 | * | 12/2004 | Hunzinger | H04W 52/0229 370/311 |

(Continued)

FOREIGN PATENT DOCUMENTS

| | | |
|---|---|---|
| JP | 2001-201986 A | 7/2001 |
| JP | 2010-064315 A | 3/2010 |

*Primary Examiner* — Jaweed A Abbaszadeh
*Assistant Examiner* — Cheri Harrington
(74) *Attorney, Agent, or Firm* — Rossi, Kimms & McDowell LLP

(57) ABSTRACT

An information processing apparatus capable of changing a state of power supply to respective parts of the apparatus with less user operation. When a sleep recovery button is depressed in a power saving mode, a button depression time is measured, and whether a length of the measure depression time exceeds a threshold value is determined. If the depression time exceeds the threshold value, a normal power mode is selected as power mode after transition. If the depression time does not exceed the threshold value, another power saving mode is selected as power mode after transition. According to the selected power mode, a state of power supply to respective parts of the apparatus is changed.

7 Claims, 9 Drawing Sheets

(56) References Cited

U.S. PATENT DOCUMENTS

| | | | |
|---|---|---|---|
| 2002/0033157 A1* | 3/2002 | Thompson | F02D 17/04 123/179.4 |
| 2002/0134268 A1* | 9/2002 | Yamada | G06K 15/00 101/484 |
| 2008/0162970 A1* | 7/2008 | Yamaji | G06F 1/3203 713/323 |
| 2008/0183880 A1* | 7/2008 | Sasage | G06F 1/26 709/229 |
| 2009/0319812 A1* | 12/2009 | Laughlin | G06F 1/3203 713/322 |
| 2010/0064157 A1* | 3/2010 | Matsuura | G06F 1/3203 713/322 |
| 2010/0182507 A1* | 7/2010 | Haggis | G01D 7/005 348/570 |
| 2011/0050403 A1* | 3/2011 | Liu | A61B 6/4405 340/384.1 |
| 2011/0060929 A1* | 3/2011 | Park | G06F 1/3209 713/323 |
| 2011/0131436 A1* | 6/2011 | Ogashiwa | G03G 15/5004 713/323 |
| 2011/0153784 A1* | 6/2011 | Sakata | G06F 1/3203 709/219 |
| 2011/0188075 A1* | 8/2011 | Narushima | G06F 1/3284 358/1.15 |
| 2011/0239023 A1* | 9/2011 | Koga | G06K 15/4055 713/323 |
| 2012/0051554 A1* | 3/2012 | Modi | H04R 5/04 381/74 |
| 2012/0077554 A1* | 3/2012 | Ahn | H04W 52/027 455/574 |
| 2012/0107005 A1* | 5/2012 | Hase | G03G 15/5004 399/70 |
| 2012/0233482 A1* | 9/2012 | Piersol | G06F 1/3265 713/323 |
| 2013/0027724 A1* | 1/2013 | Zhao | G06K 15/4055 358/1.13 |
| 2013/0083346 A1* | 4/2013 | Fujiki | G03G 15/5004 358/1.13 |
| 2013/0106189 A1* | 5/2013 | Hirst | G06F 1/26 307/52 |
| 2013/0111228 A1* | 5/2013 | Hashimoto | G06F 1/3228 713/300 |
| 2013/0232367 A1* | 9/2013 | Matsumura | G06F 1/3234 713/324 |
| 2014/0003830 A1* | 1/2014 | Higashi | G03G 15/5004 399/69 |
| 2014/0129759 A1* | 5/2014 | Sauber | G06F 3/1287 711/103 |
| 2014/0157026 A1* | 6/2014 | So | G06F 1/3206 713/323 |
| 2014/0221097 A1* | 8/2014 | Plagge | G06F 1/3206 463/36 |
| 2014/0313531 A1* | 10/2014 | Kojima | G06F 3/1221 358/1.13 |
| 2014/0344599 A1* | 11/2014 | Branover | G06F 1/3234 713/323 |
| 2014/0380032 A1* | 12/2014 | Takahashi | G06F 1/26 713/2 |

* cited by examiner

FIG. 2

| POWER MODE 201 | CONTROLLER POWER STATE 202 | PRINTER UNIT POWER STATE 203 | SCANNER UNIT POWER STATE 204 | IMAGE PROCESSOR POWER STATE 205 |
|---|---|---|---|---|
| NORMAL POWER MODE | ON | ON | ON | ON |
| FIRST POWER SAVING MODE | ON | ON | OFF | ON |
| SECOND POWER SAVING MODE | ON | OFF | ON | ON |
| THIRD POWER SAVING MODE | ON | OFF | OFF | ON |
| FOURTH POWER SAVING MOVE | ON | OFF | OFF | OFF |
| FIFTH POWER SAVING MODE | OFF | OFF | OFF | OFF |

INFORMATION PROCESSING APPARATUS CAPABLE OF SELECTING AMONG A PLURALITY OF POWER SAVING MODES USING A SIMPLE OPERATION, AND CONTROL METHOD AND STORAGE MEDIUM THEREFOR

BACKGROUND OF THE INVENTION

Field of the Invention

The present invention relates to an information processing apparatus capable of reducing power consumption, and relates to a control method and a storage medium therefor.

Description of the Related Art

In recent years, information processing apparatuses such as multi-function peripherals, printers, and facsimile machines have been configured to reduce power consumption. For example, there has been proposed an image forming apparatus that controls power saving modes of power savable parts of the apparatus according to a function selected from a plurality of functions of the apparatus (see, for example, Japanese Laid-open Patent Publication No. 2001-201986).

Japanese Laid-open Patent Publication No. 2010-064315 discloses an image forming apparatus in which an extension time is added to a basic setting time in response to an extension instruction button being pressed, whereby a mode setting time until a shift to a power saving mode (sleep mode) is newly determined to extend a time period until a shift is made from active mode to sleep mode (i.e., a time period during which the active mode is retained).

However, in the image forming apparatus disclosed in Japanese Laid-open Patent Publication No. 2010-064315, a sleep node release button is pressed to return from the sleep mode to the active mode, and the extension instruction button is pressed to extend the time period for which the active mode is retained. In other words, the operation for returning from the sleep mode and the operation for extending the time period for which the active mode is retained must be made separately from each other.

It should be noted that Japanese Laid-open Patent Publication No. 2010-064315 does not suggest a construction that enables a return from a power saving mode to a power mode desired by the user with less user operation in an apparatus having a plurality of power saving modes such as one disclosed in Japanese Laid-open Patent Publication No. 2001-201986.

SUMMARY OF THE INVENTION

The present invention provides an information processing apparatus and a control method and a storage medium therefor, with which a state of power supply to respective parts of the apparatus can be changed with less user operation.

According to one aspect of this invention, there is provided an information processing apparatus that has a plurality of power modes including a normal power mode and at least one power saving mode and that performs a mode changeover among the plurality of power modes, thereby changing a state of power supply to respective parts of the apparatus, which comprises an operation unit configured to be operated to make a transition from one of the at least one power saving mode to another power mode, a measurement unit configured, to measure an operation time of the operation unit, a selection unit configured to select a power mode after transition according to a length of the operation time of the operation unit measured by the measurement unit, and a control unit configured to change the state of power supply to respective parts of the apparatus according to the power mode selected by the selection unit.

With this invention, a power mode after transition is selected according to a length of operation time of the operation unit, which is operated to make a transition from a power saving mode to another power mode among power modes, and the state of power supply to respective parts of the apparatus is changed according to the selected power mode, whereby the state of power supply to respective parts of the apparatus can be changed with less user operation in a short period of time.

Further features of the present invention will become apparent from the following description of exemplary embodiments (with reference to the attached drawings).

BRIEF DESCRIPTION OF THE DRAWINGS

FIG. 2 is a view showing an example of a power supply management table in which a correspondence relation between power modes of the image forming apparatus and states of power supply to respective parts of the image forming apparatus is shown;

FIG. 3 is a flowchart showing the flow of a depression time measurement process executed in step S302 of the power mode selection and transition process of FIG. 3 when the sleep recovery button is depressed in a state that the CPU stops operating.

DESCRIPTION OF THE EMBODIMENTS

The present invention will now be described in detail below with reference to the drawings showing preferred embodiments thereof.

First Embodiment

Figure 1:
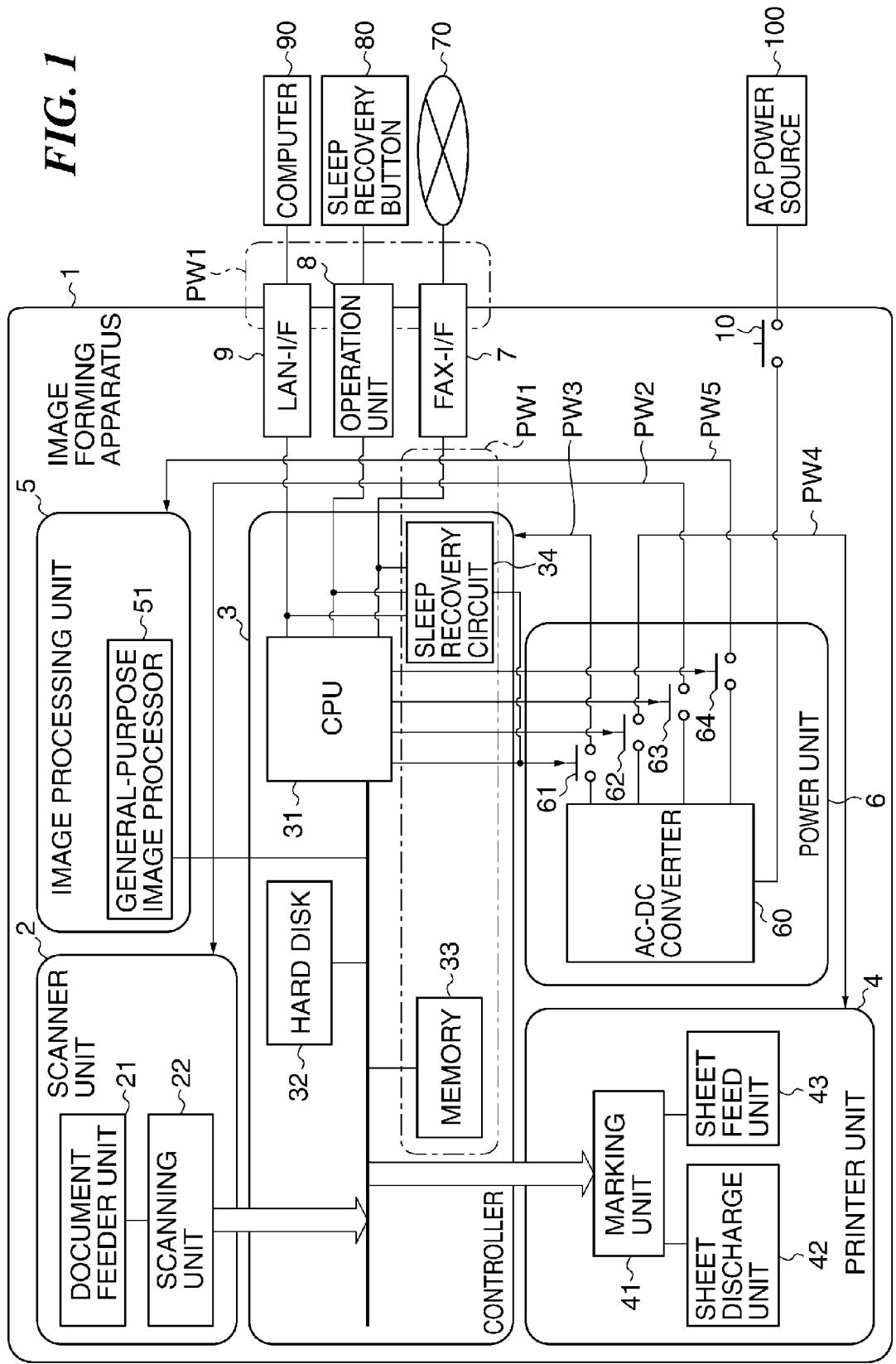
FIG. 1 is a block diagram schematically showing the construction of an image forming apparatus, which is an example of an information processing apparatus according to a first embodiment of this invention.

FIG. 1 schematically shows in block diagram the construction of an image forming apparatus, which is an example of an information processing apparatus according to a first embodiment of this invention.

As shown in FIG. 1, the image forming apparatus 1 has a scanner unit 2 that functions as a reading unit for optically reading an image from a document. The scanner unit 2 includes a document feeder unit (DF unit) 21 for automatically feeding documents one by one from a document bundle set on the DF unit, and a scanning unit 22 for optically scanning each document to obtain a digital image.

A printer unit 4 prints out a digital image on a paper medium. The printer unit 4 includes a sheet feed unit 43 capable of feeding sheets one by one from a sheet bundle set thereon, a marking unit 41 for printing image data on a fed sheet, and a sheet discharge unit 42 for discharging a printed sheet.

A controller 3 that has a CPU 31, a hard disk 32, and a memory 33 controls transmission and reception of image data between the scanner unit 2 and the printer unit 4, and can store image data. Under the control of the controller 3, image data received from the scanner unit 2 is temporarily stored into the memory 33 and then stored into the hard disk 32, for example. The hard disk 32 can store digital image, control programs, etc. Under the control of the controller 3, image data is temporarily stored from the hard disk 32 into the 3 and transmitted from the memory 33 to the printer unit 4, whereby the image data can be printed out.

An image processing unit 5 has a general-purpose image processor 51 by which image data stored in the memory 33 can be reduction-processed, for example. The processed image data can be stored again into the memory 33.

According to an instruction from the CPU 31, a FAX_I/F 7 transmits, via facsimile, digital image through e.g. a telephone line 70, and externally receives facsimile data through e.g. the telephone line 70.

An operation unit 8 has a display device for displaying image forming apparatus setting information and job information to a user. The operation unit 8 includes keys and buttons for operating the image forming apparatus 1 such as, for example, a button 80 for recovery from sleep (operation button), which will be referred to as the sleep recovery button 80. The sleep recovery button 80 is operated to transit the image forming apparatus 1 from a power saving state to a normal power state or to another power saving state.

A LAN_I/F 9 controls communication with an external computer 90 via LAN. The CPU 31 can input and output a digital image from and to the computer 90 via the LAN, can issue a job, and can give an instruction to a device. The CPU 31 can interpret an instruction for operation given from the operation unit 8 and can interpret instruction information given from the computer 90, whereby a variety of jobs can be carried out.

A power unit 6 has an AC-DC converter 60 connected to an external AC power source 100 via a switch 10 that is provided in the image forming apparatus 1. The power unit 6 includes switches 61-64 interposed between the AC-DC converter 60 and respective ones of the controller 3, printer unit 4, scanner unit 2, and image processing unit 5. When the switch 10 is ON, power is supplied from the AC power source 100 to the AC-DC converter 60 in which DC powers are generated. The DC powers are supplied to respective parts of the image forming apparatus 1 via the switches 61-64 that are on-off controlled by the CPU 31.

More specifically, the CPU 31 controls the on-off of the switch 61 to on-off control the supply of controller power PW3 from the AC-DC converter 60 to the controller 3, controls the on-off of the switch 62 to on-off control the supply of printer unit power PW4 from the AC-DC converter 60 to the printer unit 4, and controls the on-off of the switch 63 to on-off control the supply of scanner unit power PW2 from the AC-DC converter 60 to the scanner unit 2. The CPU 31 also controls the on-off of the switch 64 to on-off control the supply of general-purpose image processor power (hereinafter, referred to as the image processor power) PW5 from the AC-DC converter 60 to the image processing unit 5.

When the controller power PW3 is cut off, the CPU 31 of the controller 3 is not supplied with power. Accordingly, the controller 3 has a sleep recovery circuit 34 for turning on the controller power PW3.

The image forming apparatus 1 has a copy function, image transmission function, image storage function, image printing function, FAX reception printing function, FAX transfer function, FAX memory reception function, and FAX transmission function.

The copy function is used to store an image read from the scanner unit 2 into the hard disk 32 and to print the image by the printer unit 4. The image transmission function is used to store an image read from the scanner unit 2 into the hard disk 32 and to transmit the image to the computer 90 via the LAM. The image storage function is used to store an image read from the scanner unit 2 into the hard disk 32 and where required, to transmit or print the image. The image printing function is used to analyze PDL (page description language) data received from the computer 90 and to print the data by the printer unit 4.

The FAX reception printing function is used to store a FAX image received from the FAX_I/F 7 into the hard disk 32 and to print the FAX image by the printer unit 4. The FAX transfer function is used to store a FAX image received from the FAX_I/F 7 into the hard disk 32 and to transfer the FAX image to e.g. the computer 90 via the LAN. The FAX memory reception function is used to store a FAX image received from the FAX_I/F 7 into the hard disk 32 and to wait for the FAX image being referred to by an operator (user). The FAX transmission function is used to store an image read from the scanner unit 2 into the hard disk 32 and to transmit the image from the FAX_I/F 7 to the telephone line 70.

It should be noted that an image is stored into the hard disk 32 in many cases when, the above-described functions are used. This is because to prepare for failure of job execution and to recover from an abnormal state such as power disconnection.

The image forming apparatus 1 has a function to shift from a normal power state to a power saving state where the controller power PW3 is turned off or to another power saving state where the controller power PW3 is turned off, and has a function to return from the power saving state to the other power saving state or to the normal power state.

In the sleep state, each of peripheral devices of the CPU 31 (such as the hard disk 32, memory 33, image processing unit 5, scanner unit 2, printer unit 4, LAN_I/F 9, operation unit 8, and FAX_I/F 7) is in a suspend state (e.g., ACPI-S3 state). In other words, the power PW1 at the time of sleep is supplied only to a job detection part of the image forming apparatus 1. Therefore, the power consumption of the entire apparatus becomes extremely small. Before entering sleep, the CPU 31 stores the state of the image forming apparatus 1 into the memory 33, and then turns off the supply of the controller power PW3 to the controller 3. As a result, the CPU 31 of the controller 3 does not operate. However, since the power PW1 at the time of sleep is supplied to respective ones of part of the FAX_I/F 7, part of the operation unit 8, part of the LAN_I/F 9, the sleep recovery circuit 34, and the memory 33, a return instruction can be detected, whereby the sleep state can be transferred to a standby state When network reception is performed via the LAN_I/F 9, or when FAX call is received via the FAX_I/F 7, or when the sleep recovery button 80 of the operation unit 8 is pressed, the sleep recovery circuit 34 detects a return signal, and turns on the switch 61 to thereby turn on the supply of the controller power PW3.

The CPU 31 reads the apparatus state stored in the memory 33 therefrom, and performs resetting to make a shift to the state (e.g., standby state) immediately before the supply of the controller power PW3 was turned off.

In the standby state, the CPU 31 receives, e.g., a job input by an operator via the operation unit 3 or a job transmitted from the computer 90 via the LAN_I/F, and turns on the supply of power (among the printer unit power PW4, scanner unit power PW2, and image processor power PW5, which were turned off in the sleep state) to one or more devices used for job execution.

In the case of copy job, the supply of scanner unit power PW2 and printer unit power PW4 is turned on. In the case of image transmission job or image storage job, only the supply of scanner unit power PW2 is turned on. In the case of image printing job, only the supply of printer unit power PW4 is turned on. In the case of FAX reception printing job, the supply of printer unit power PW4 and image processor power PW5 is turned on. In the case of FAX transfer job or FAX memory reception job, only the supply of image processor power PW5 is turned on. In the case of FAX transmission job, the supply of scanner unit power PW2 and image processor power PW5 is turned on.

When the standby state is resumed after completion of the job execution, the supply of power to the device(s) used for the job execution is stopped, thereby reducing standby power consumed in the standby state.

The image forming apparatus 1 has an auto sleep timer function of automatically shifting to the sleep state when the user does not operate the operation unit 8 for a predetermined time period in the standby state, so that no job is input within the predetermined time period. An auto sleep timer value representing a time period until automatically shifted from the standby state to the sleep state by the auto sleep timer function is set by the user through the operation unit 8 and stored into the hard disk 32, for example.

At startup of the image forming apparatus 1, the auto sleep timer value read from the hard disk 32 is written into an auto sleep timer value storage area of the memory 33. A timer (not shown) provided in the CPU 31 performs countdown from the auto sleep timer value (initial value). When the count value of the timer becomes zero, a timer interruption occurs and interruption is notified to software running on the CPU 31, and transition processing from standby state to sleep state is performed by the CPU 31. On the other hand, when a user operation is performed through the operation unit 8 or a job is input before the count value of the timer becomes zero (i.e., before lapse of the setting time period), the timer is set with the auto sleep timer value and then restarted.

FIG. 2 shows an example of a power supply management table in which a correspondence relation between power modes of the image forming apparatus 1 and states of power supply to respective parts of the image forming apparatus 1 is shown.

Referring to FIG. 2, the power supply management table 200 includes a power mode field 201, controller power state field 202, printer unit power state field 203, scanner unit power state field 204, and image processor power state field 205.

In the power mode field 201, there are shown six power modes, i.e., a normal power mode and first to fifth power saving modes. Each of the power state fields 202 to 205 has six ON/OFF information fields respectively corresponding to the six power modes. In each of the ON/OFF information fields, there is shown ON information representing that power is to be supplied to a corresponding device or OFF information representing that power is not to be supplied to the corresponding device.

The ON information is indicated in the ON/OFF information fields of the power state fields 202 to 205 corresponding to the normal power mode. This indicates that the supply of controller power PW3, printer unit power PW4, scanner unit power PW2, and image processor power PW5 is turned on in the normal power mode. In the normal power mode, the power is supplied to all the devices used for execution of various jobs such as copy job, whereby various jobs can be carried out immediately.

The ON information is indicated in the ON/OFF information fields of the power state fields 202, 203 and 205 corresponding to the first power saving mode, and the OFF information is indicated in the ON/OFF information field of the power state field 204 corresponding to the first power saving mode. This indicates that the supply of controller power PW3, printer unit power PW4, and image processor power PW5 is turned on and the supply of scanner unit power PW2 is turned off in the first power saving mode. The first power saving mode is used, for example, when print data received from the LAN_I/F 9 is image-processed by the image processor 51 and the processed image is printed by the printer unit 4.

The ON information is indicated in the ON/OFF information fields of the power state fields 202, 204 and 205 corresponding to the second power saving mode, and the OFF information is indicated in the ON/OFF information field of the power state field 203 corresponding to the second power saving mode. This indicates that the supply of controller power PW3, scanner unit power PW2, and image processor power PW5 is turned on and the supply of printer unit power PW4 is turned off in the second power saving mode. The second power saving mode is used, for example, when image data read by the scanner unit 2 is image-processed by the general-purpose image processor 51 and the processed image is transmitted to the computer 90 via the LAN_I/F 9.

The ON information is indicated in the ON/OFF information fields of the power state fields 202, 205 corresponding to the third power saving mode and the OFF information is indicated in the ON/OFF information fields of the power state fields 203, 204 corresponding to the third power saving mode. This indicates that the supply of controller power PW3 and image processor power PW5 is turned on and the supply of scanner unit power PW2 and printer unit power PW4 is turned off in the third power saving mode. The third power saving mode is used, for example, when image data received via the LAN_I/F 9 is image-processed by the general-purpose image processor 51 and the processed image is stored into the hard disk 32.

The ON information is indicated in the ON/OFF information field of the power state field 202 corresponding to the fourth power saving mode, and the OFF information is indicated in the ON/OFF information fields of the power state fields 203 to 205 corresponding to the fourth power saving mode. This indicates that the supply of controller power PW3 is turned on and the supply of printer unit power PW4, scanner unit power PW2, and image processor power PW5 is turned off in the fourth power saving mode. The fourth power saving mode is used, for example, when an inquiry about the state of the image forming apparatus 1 is received from the computer 90 via the LAN_I/F 9, and a response notifying the apparatus state is transmitted to the computer 90 via the LAN_I/F 9.

The OFF information is indicated in the ON/OFF information fields of the power state fields 202 to 205 corresponding to the fifth power saving mode. This indicates that the supply of controller power PW3, scanner unit power PW2, image processor power PW5, and printer unit power PW4 is turned off in the fifth power saving mode. In the fifth power saving mode, none of the devices is supplied with power. Among the six power modes, the fifth power saving mode is the lowest in power consumption and highest in power saving effect.

Next, a description will be given of a power mode selection and transition process that is executed according to a length of depression time of the sleep recovery button 80. In this process, a power mode after transition is selected and a transition to the selected power mode is performed.

Figure 3:
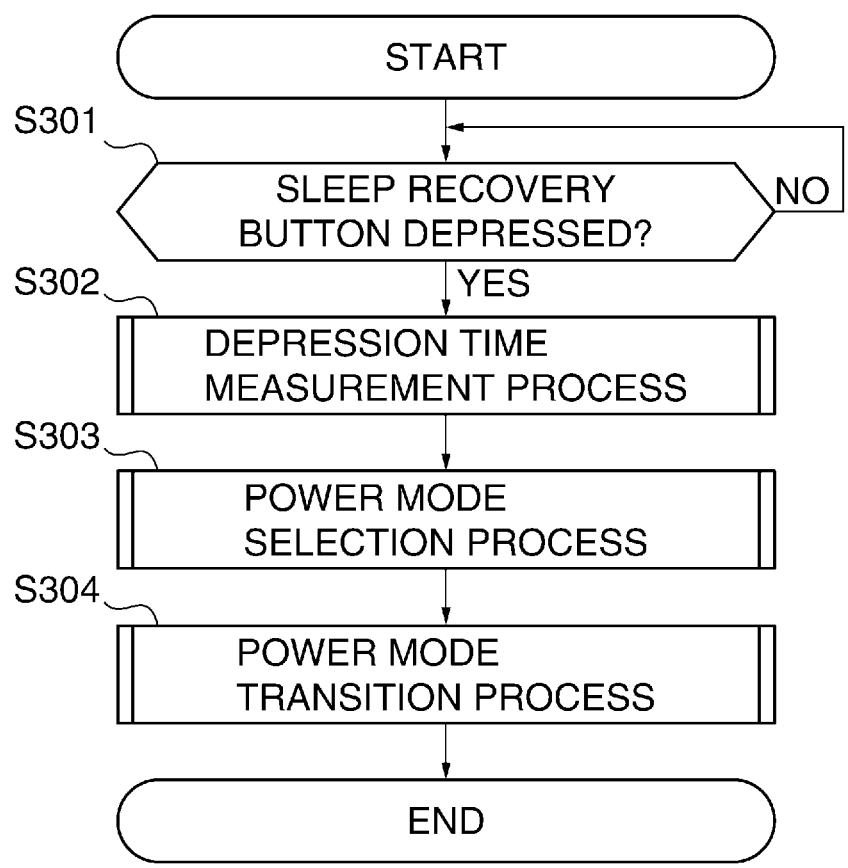
FIG. 3 is a flowchart showing the flow of a power mode selection and transition process executed when a sleep recovery button (a button for recovery from sleep) is depressed.

FIG. 3 shows in flowchart the flow of a power mode selection and transition process executed when the sleep recovery button 80 is depressed in a case where current power mode is one of the first to fourth power saving modes shown in FIG. 2 (i.e., in a state that the CPU 31 is supplied with power). It should be noted that the power mode selection and transition process of FIG. 3 and processes described later are each performed by the CPU 31 by executing a relevant control program read from the hard disk 32 or the like.

In step S301, the CPU 31 determines whether or not the sleep recovery button 80 is depressed. More specifically, when the sleep recovery button 80 is depressed, an interruption signal is input via the operation unit 8 to the CPU 31, thereby notifying the interruption to software running on the CPU 31. In other words, when the interruption is notified, it is determined that the sleep recovery button 80 is depressed.

If the sleep recovery button 80 is not depressed (NO to step S301), the process returns to step S301. On the other hand, if the sleep recovery button 80 is depressed (YES to step S301), the CPU 31 performs a depression time measurement process, thereby measuring a depression time of the sleep recovery button 80 (step S302). The details of the depression time measurement process will be described later with reference to FIG. 4.

In step S303, the CPU 31 performs a power mode selection process based on the button depression time measured in step S302, thereby selecting a power mode after transition. The details of the power mode selection process will be described later with reference to FIG. 5.

In step S304, the CPU 31 confirms the power supply destination in the power mode after transition selected in step S303, while referring to the power supply management table 200 of FIG. 2, and performs a power mode transition process (details of which will be described later with reference to FIG. 6) for transition to the power mode after transition. Then, the present process is completed.

Figure 4:
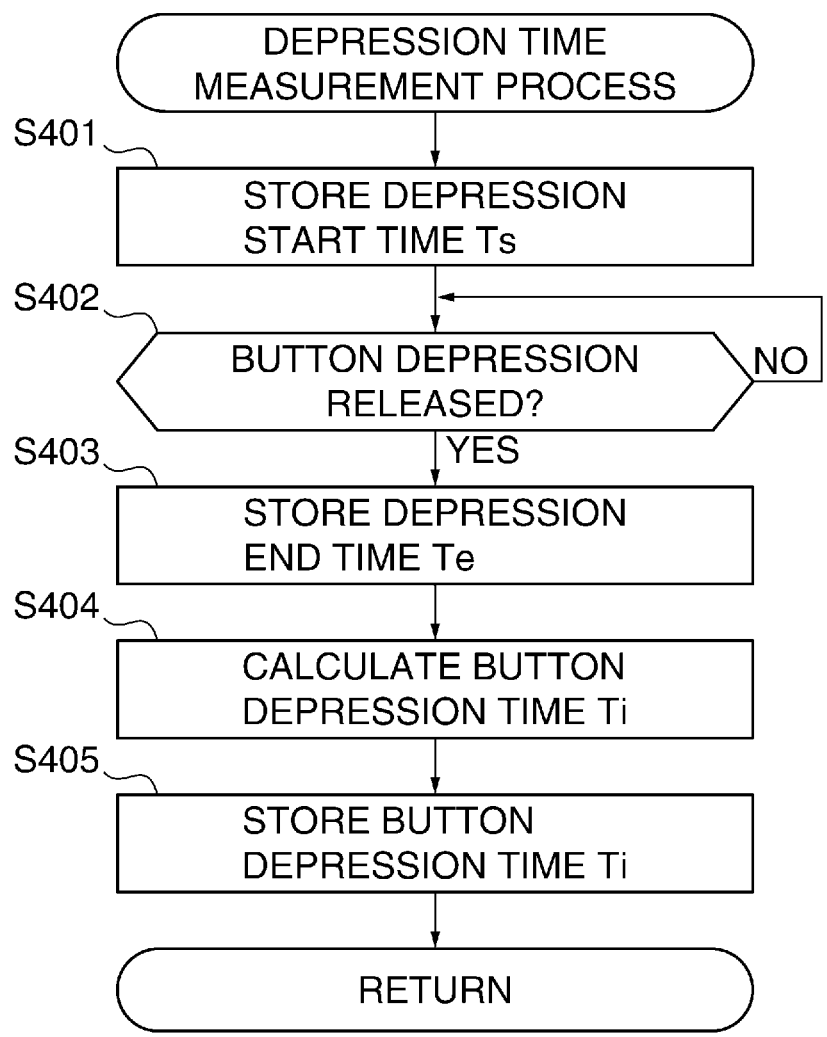
FIG. 4 is a flowchart showing details of a depression time measurement process executed in step S302 of FIG. 3.

FIG. 4 shows in flowchart the details of the depression time measurement process executed in step S302 of FIG. 3.

First, the CPU 31 stores, as a depression start time Ts, a time point at which the sleep recovery button 80 is pressed (step S401) More specifically, the CPU 31 has a timer register that counts a clock pulse supplied thereto, and the OS running on the CPU 31 performs time management based on register value. When the sleep recovery button 80 is pressed and an interruption signal is supplied to the CPU 31, the software running on the CPU 31 obtains the depression start time Ts via the OS and stores the depression start time Ts into the memory 33.

Next, in step S402, the CPU 31 determines whether or not an interruption release signal is input, thereby determining whether the press of the sleep recovery button 30 is released. If the press of the button 80 is not released (NO to step S402), the process returns to step S402. On the other hand, the press of the button 30 is released (YES to step S402), the CPU 31 stores, into the memory 33, a time point where the press of the sleep recovery button 80 is released, as a depression end time Te (step S403).

Next, the CPU 31 reads the depression start time Ts and the depression end time Te stored in the memory 33, and calculates a button depression time Ti by subtracting the depression start time Ts from the depression end time Te (step S404).

Next, the CPU 31 stores the button depression time Ti calculated in step S404 into the memory 33 (step S405), and returns to the power mode selection and transition process of FIG. 3.

Figure 5:
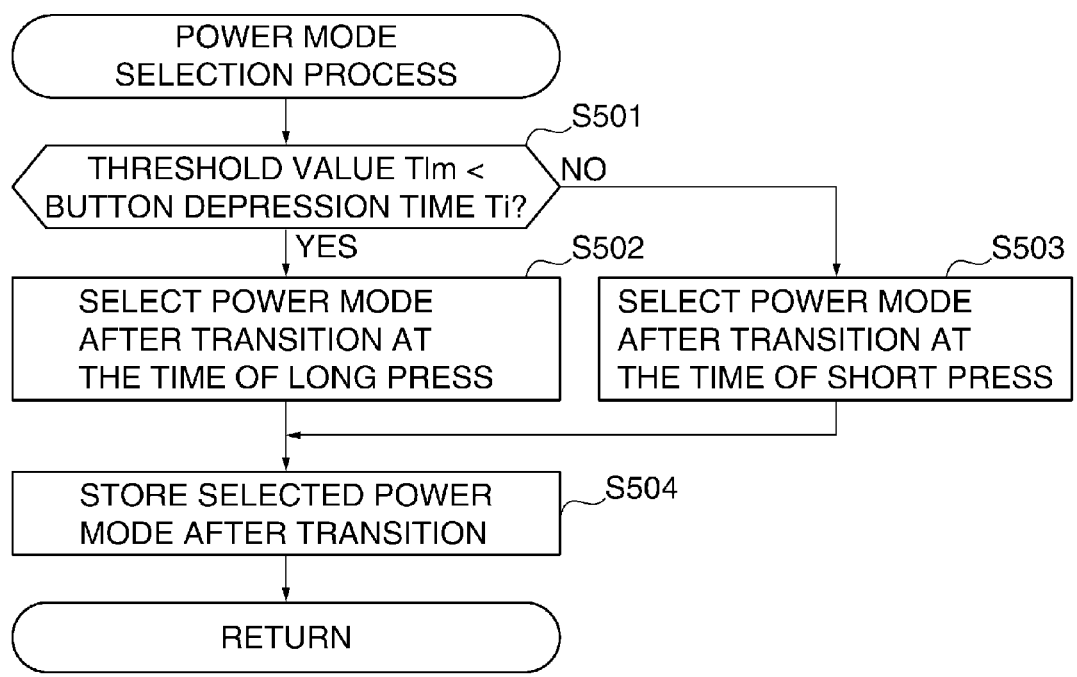
FIG. 5 is a flowchart showing details of a power mode selection process executed in step S303 of FIG. 3.

FIG. 5 shows in flowchart the details of the power mode selection process executed in step S303 of FIG. 3 based on the button depression time Ti obtained in the depression time measurement process of FIG. 4.

At start of the power mode selection process, the CPU 31 compares the button depression time Ti read from the memory 33 with a threshold value Tlm read from the hard disk 32, thereby determining whether or not the button depression time Ti exceeds the threshold value Tlm (step S501). If the button depression time Ti exceeds the threshold value Tlm (YES to step S501), the CPU 31 selects a first particular power mode (e.g., normal power mode), which is set in advance by the user as a power mode after transition at the time of long press (step S502).

On the other hand, if the button depression time Ti does not exceed the threshold value Tlm (NO to step S501), the CPU 31 selects a second particular power mode (e.g., second power saving mode), which is set in advance by the user as a power mode after transition at the time of short press (step S503).

On the screen of the operation unit 8, the user can set and change the power modes after transition at the time of long press and at the time of short press of the sleep recovery button 80. The set power modes after transition are stored into the hard disk 32.

In step S504, the CPU 31 stores, into the memory 33, the power mode Smode after transition selected in step S502 or in step S503, and returns to the power mode selection and transition process of FIG. 3.

Figure 6:
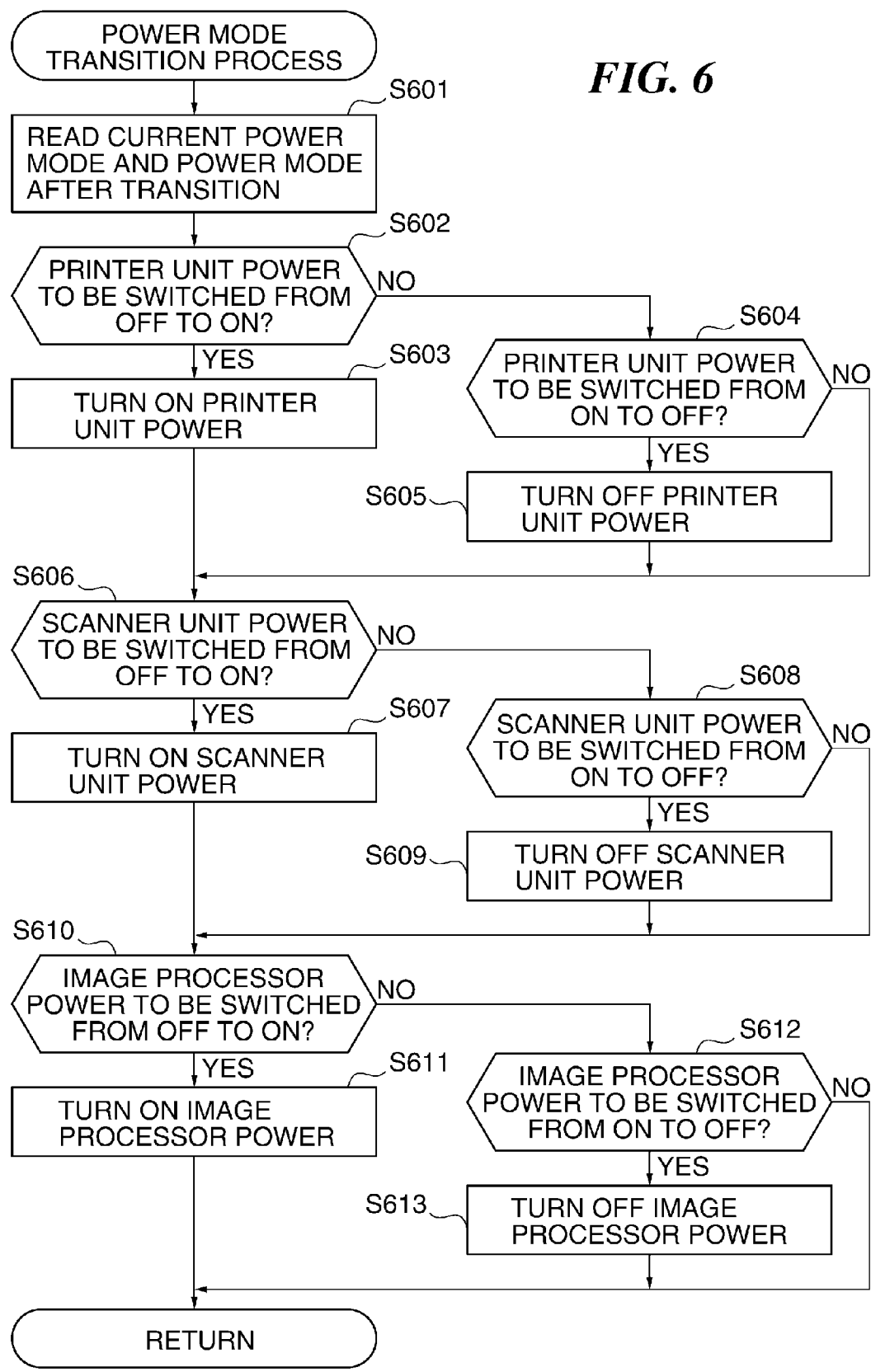
FIG. 6 is a flowchart showing details of a power mode transition process executed in step S304 of FIG. 3.

FIG. 6 shows in flowchart the details of the power mode transition process executed in step S304 of FIG. 3 based on the power mode after transition selected in the power mode selection process of FIG. 5.

In step S601, the CPU 31 reads from the memory 33 the current power mode stored in the memory 33 and the power mode Smode after transition stored into the memory 33 in step S504 of FIG. 5. Information representing the current power mode is updated and overwritten to the memory 33 each time the power mode is changed. As previously described, the current power mode in this example is one of the first to fourth power saving modes shown in FIG. 2 and will be referred, to as the current power saving mode Snow.

In step S602, while referring to the power supply management table 200 of FIG. 2, the CPU 31 determines whether or not OFF information is indicated in the ON/OFF information field of the printer unit power state field 203 corresponding to the current power saving mode and ON information is indicated in the ON/OFF information field of the printer unit power state field 203 corresponding to the power mode after transition. In other words, the CPU 31 determines whether or not the supply of printer unit power PW4 is turned off in the current power saving mode and is to be turned on in the power mode after transition (step S602).

If the answer to step S602 is YES, i.e., if the supply of printer unit power PW4 is to be switched from OFF to ON, the CPU 31 controls the switch 62 to turn on the supply of printer unit power PW4 (step S603), and proceeds to step S606. On the other hand, if the answer to step S602 is NO, the CPU 31 determines whether or not the supply of printer unit power PW4 is turned on in the current power saving mode and is to be turned off in the power mode after transition (step S604).

If the answer to step S604 is YES, the CPU 31 controls the switch 62 to turn off the supply of printer unit power PW4 (step S605). On the other hand, if the answer to step S604 is NO, the process proceeds to step S606.

In step S606, the CPU 31 determines whether or not the supply of scanner unit power PW2 is turned off in the current power saving mode and is to be turned on in the power mode after transition. If the answer to step S606 is YES, the CPU 31 controls the switch 63 to turn on the supply of scanner unit power PW2 (step S607), and proceeds to step S610. On the other hand, if the answer to step S606 is NO, the CPU 31 determines whether or not the supply of scanner unit power PW2 is turned on in the current power saving mode and is to be turned off in the power mode after transition (step S608). If the answer to step S608 is YES, the CPU 31 controls the switch 63 to turn off the supply of scanner unit power PW2 (step S609). On the other hand, if the answer to step S608 is NO, the process proceeds to step S610.

In step S610, the CPU 31 determines whether or not the supply of image processor power PW5 is turned off in the current power saving mode and is to be turned on in the power mode after transition. If the answer to step S610 is YES, the CPU 31 controls the switch 64 to turn on the supply of image processor power PW5 (step S611), and returns to the power mode selection and transition process of FIG. 3. On the other hand, if the answer to step S610 is NO, the CPU 31 determines whether or not the supply of image processor power PW5 is turned on in the current power saving mode and is to be turned off in the power mode after transition (step S612). If the answer to step S612 is YES, the CPU 31 controls the switch 64 to turn off the supply of image processor power PW5 (step S613), and returns to the power mode selection and transition process of FIG. 3. On the other hand, if the answer to step S612 is NO, the process returns to the process of FIG. 3.

As described above, the state of power supply to respective parts of the image forming apparatus is switched according to the power mode after transition, and the power mode transition process is executed. After completion of the power mode transition process, the current power saving mode Snow is updated to the power mode Smode after transition, and the updated mode is overwritten and stored into the memory 33.

Figure 7:
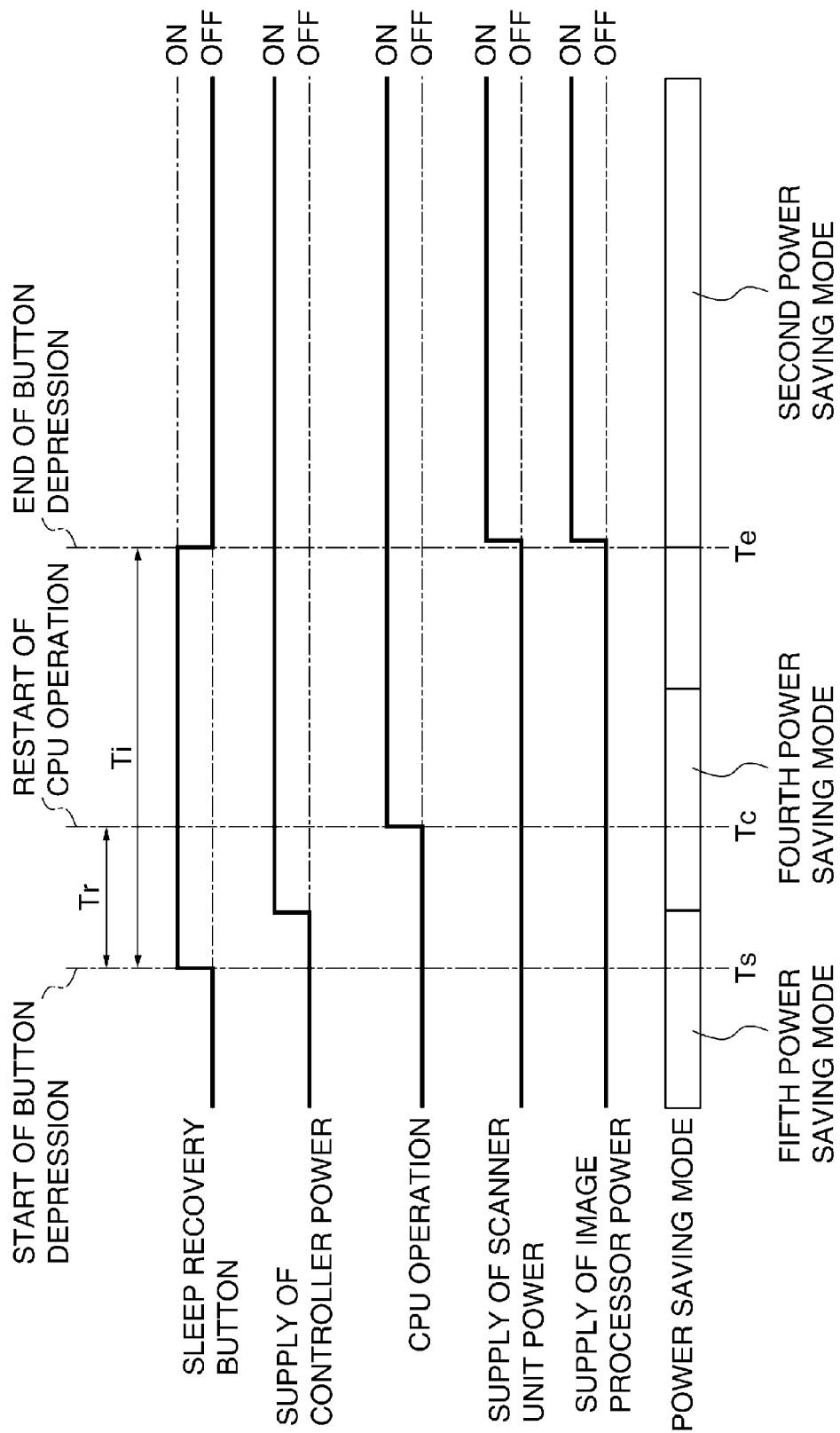
FIG. 7 is a time chart showing transitions of the state of power supply to respective parts of the image forming apparatus observed when the sleep recovery button is depressed in a state that a CPU of the image forming apparatus stops operating.

FIG. 7 shows, in time chart, transitions of the state of power supply to respective parts of the image forming apparatus 1 observed when the power mode is the fifth power saving mode shown in FIG. 2 and when the sleep recovery button 80 is depressed in a state that the CPU 31 stops operating.

In FIG. 7, an ON/OFF change of the sleep recovery button 80, an ON/OFF change of operation of the CPU 31, ON/OFF changes of supply of controller power PW3, scanner unit power PW2, and image processor power PW5, and a power mode change are shown with the lapse of time.

If the power mode before the sleep recovery button 80 is pressed is the fifth power saving mode as shown in FIG. 7, the supply of controller power PW3, scanner unit power PW2, and image processor power PW5 is turned off, and the CPU 31 stops operating.

When the depression of the sleep recovery button 80 is started at a time point of Ts, the sleep recovery button 80 changes from OFF to ON. Subsequently, the sleep recovery circuit 34 operates, the supply of controller power PW3 is started, and the power mode is transited from the fifth power saving mode to the fourth power saving mode.

When the supply of controller power PW3 is stabilized at a time point of Tc, the CPU 31 is reset-released and restarts the operation.

When the completion of depression of the sleep recovery button 80 is detected at the time point of Te, the button depression time is calculated and based on the calculated time, a power mode after transition is selected. In this example, the second power saving mode is selected as the power mode after transition, and a transition process from the fourth power saving mode to the second power saving mode is performed. In the transition process to the second power saving mode, the supply of scanner unit power PW2 and image processor power PW5 is restarted, and the transition to the second power saving mode is completed.

As shown in FIG. 7, the button depression time Ti is represented by the sum of a time period (hereinafter, referred to as the CPU restart wait time period) Tr from the start of button depression to the restart of CPU operation and a time period from the CPU operation restart time Tc to the button depression completion time Te.

During the CPU restart wait time period Tr, the CPU 31 stops operating, and cannot measure the CPU restart wait time period Tr. On the other hand, the CPU restart wait time period Tr is determined by a processing time period of the sleep recovery circuit 34 and a reset release wait time period, and therefore has nearly a constant value. At startup of the apparatus, a fixed value, which represents the CPU restart wait time period Tr and which was stored into the hard disk 32 at fabrication of the image forming apparatus 1, is read from the hard disk 32 and stored into the memory 33, whereby the CPU restart wait time period Tr can be read from the memory 33 when the button depression time is calculated. The button depression time Ti can be obtained by adding the CPU restart wait time period Tr to a time period measured by the CPU 31 from the CPU operation restart time Tc to the button depression completion time Te.

In the following, a description will be given of the depression time measurement process executed when the sleep recovery button 80 is pressed in a case that the current power mode is the fifth power saving mode shown in FIG. 2, i.e., in a state that the CPU 31 stops operating.

Figure 8:
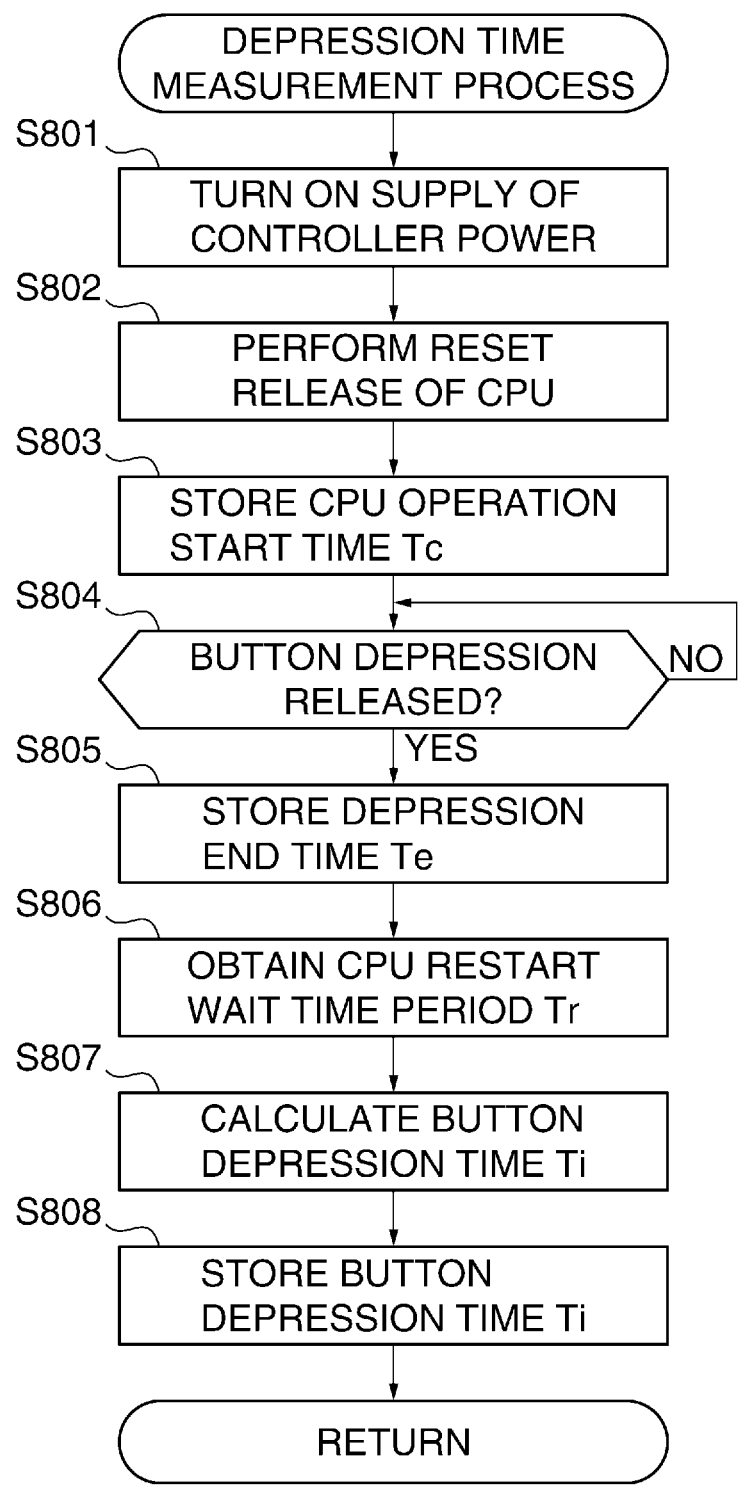

FIG. 8 shows in flowchart the flow of the depression time measurement process executed in step S302 of the power mode selection and transition process of FIG. 3 when the sleep recovery button 80 is pressed in a state that the CPU 31 stops operating.

When the sleep recovery button 80 is started to be depressed, the sleep recovery circuit 34 operates, the switch 61 is turned on by the sleep recovery circuit 34, and the supply of controller power PW3 is started (step S801). Until the voltage of controller power PW3 is stabilized, the CPU 31 is retained in a reset state for a predetermined time period by a reset circuit (not shown). After the voltage is stabilized, the CPU 31 is reset-released and restarts the operation (step S802).

Immediately after the operation is restarted, the CPU 31 obtains and stores the CPU operation start time Tc into the memory 33 (step S803), and detects by interruption whether or not the depression of the sleep recovery button 30 is released (step S804). If the depression of the sleep recovery button 80 is not released, the process returns to step S804. If the depression of the sleep recovery button 30 is released, the CPU 31 obtains the depression end time Te at which the depression of the sleep recovery button 30 is ended, and stores the obtained, time Te into the memory 33 (step S805).

Next, the CPU 31 reads from the memory 33 and obtains the CPU restart wait time period Tr, CPU operation start time Tc, and depression end time Te (step S606). Then, the CPU 31 calculates a time period from the CPU operation start time Tc to the depression end time Te, and adds the CPU restart wait time period Tr to the calculated time period to thereby calculate a button depression time Ti (step S807). The CPU 31 stores the calculated button depression time Ti into the memory 33 (step S808), and returns to the power mode selection and transition process of FIG. 3.

With the depression time measurement process described above, the depression time of the sleep recovery button 80 can correctly be determined, even if the power mode is transited from a state where the CPU 31 stops operating.

According to the first embodiment, one of the power modes set in advance by the user is selected according to a length of depression time of the sleep recovery button 80, and the state of supply of power to respective parts of the image forming apparatus is changed based on the selected power mode, whereby a transition to the power mode set by the user can be achieved with less user operation in a short time.

Second Embodiment

An image forming apparatus according to a second embodiment of this invention is basically the same as that of the first embodiment except that the auto sleep timer value is changed based on the button depression time of the sleep recovery button 80. A description of points common to the first and second embodiments will be omitted.

Figure 9:
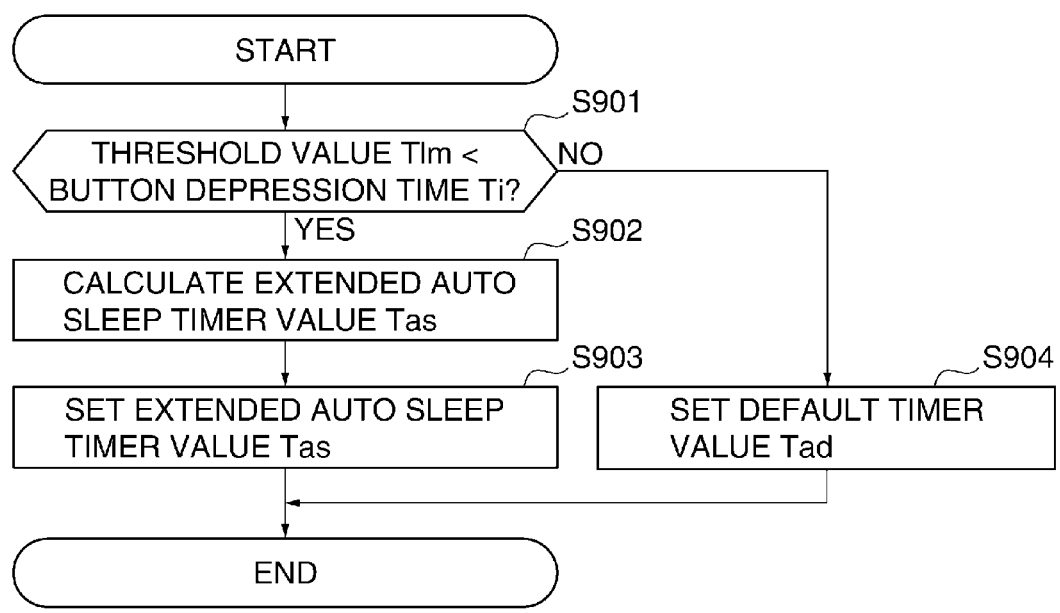
FIG. 9 is a flowchart showing the flow of an auto sleep timer value setting process according to a second embodiment of this invention.

FIG. 9 shows in flowchart the flow of an auto sleep timer value setting process of this embodiment. It should be noted that this process is executed by the CPU 31 by executing a relevant control program read from e.g. the hard disk 32 immediately after the power mode selection process of FIG. 5 or immediately after the power mode transition process of FIG. 6, for example.

As with the case of the power mode selection process of FIGS. 3 and 5, the CPU 31 compares the button depression time Ti read from the memory 33 with the threshold value. Tlm read from the hard disk 32, and determines whether or not the button depression time Ti exceeds the threshold value Tlm (step S901).

If the button depression time Ti exceeds the threshold value Tlm (YES to step S901), the CPU 31 determines that the sleep recovery button 80 is long pressed, and calculates an extended auto sleep timer value Tas (step S902). The extended auto sleep timer value Tas can be calculated by multiplying a default timer value Tad (which is an ordinary auto sleep timer value) by an extension magnification that is obtained by dividing the button depression time Ti by the threshold value Tlm.

Next, the CPU 31 writes the extended auto sleep timer value Tas into an auto sleep timer value storage area of the memory 33 (step S903).

On the other hand, if the button depression time Ti does not exceed the threshold value Tlm (NO to step S901), the CPU 31 writes the default timer value Tad into the auto sleep timer value storage area of the memory 33 (step S904).

As described above, the selection of the power mode after transition and the extension of the auto sleep timer value can be performed by a single button depression operation.

According to the second embodiment, the auto sleep timer value is extended according to the length of depression time of the sleep recovery button 80 in the image forming apparatus having the auto sleep function for making a transition to the sleep state when a predetermined time period corresponding to the auto sleep timer value has lapsed in a predetermined condition. This makes it possible, with less user operation, to achieve a transition to the power mode set by the user and to extend the time period until the transition to the power mode is started.

In the auto sleep timer value setting process of FIG. 9, when the sleep recovery button 80 is long pressed, the auto sleep timer value is always extended. However, it is possible to allow the user to select whether or not the timer value is to be extended in such a case. Although in the process of FIG. 9 the length of depression time of the sleep recovery button 80 is compared with one threshold value and the power mode after transition is selected from two candidate modes, two or more threshold values can be used and the power mode after transition can be selected from three or more candidate modes.

The information processing apparatus is configured by the image forming apparatus in the first and second embodiments, but can be configured by an apparatus other than the image forming apparatus, such as a portable information terminal, a PC, a cellular phone, or the like.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138802, filed Jul. 2, 2013, which is hereby incorporated, by reference herein in its entirety.

What is claimed is:

1. A printing apparatus comprising:
   a printer;
   a controller that includes at least a processor, a memory, and a sleep recovery circuit, and controls the printer; and
   a sleep recovery button that receives a user operation and causes a signal to be detected by the sleep recovery circuit in response to receiving the user operation,
   wherein, when an auto sleep timer value becomes zero, the controller shifts the printing apparatus to a power saving mode in which power is not supplied to the printer and the processor, but power is supplied to the sleep recovery circuit,
   wherein, when the sleep recovery button receives the user operation, the sleep recovery circuit detects the signal and causes power to be supplied to the processor and the memory, thereby causing the controller to:
      in a case where an operation time of the sleep recovery button is shorter than a threshold value, shift the printing apparatus from the power saving mode to a first power mode in which power is not supplied to the printer, and reset the auto sleep timer value to a default value; and
      in a case where the operation time of the sleep recovery button is longer than a threshold value, shift the printing apparatus from the power saving mode to a second power mode in which power is supplied to the printer, and reset the auto sleep timer value to an extended value different from the default value, according to the operation time of the sleep recovery button, and
   wherein the operation time of the sleep recovery button includes a depression time of the sleep recovery button.

2. The printing apparatus according to claim 1,
   wherein the controller controls, in response to the sleep recovery button being operated, supply of power to the processor, and
   wherein the processor which is supplied with power calculates the operation time of the sleep recovery button and determines the power mode to which the printing apparatus is to be shifted, based on the calculated operation time of the sleep recovery button.

3. The printing apparatus according to claim 2, further comprising:
   a power supply unit configured to supply first DC power to the processor; and
   a first switch arranged between the power supply unit and the processor,
   wherein the controller turns the first switch on in response to the sleep recovery button being operated in the power saving mode.

4. The printing apparatus according to claim 3,
   wherein the sleep recovery circuit turns the first switch on in response to the sleep recovery button being operated in the power saving mode.

5. The printing apparatus according to claim 2, further comprising:
   a power supply unit configured to supply first power to the processor and supply second power to the printer;
   a first switch arranged between the power supply unit and the processor; and
   a second switch arranged between the power supply unit and the printer,
   wherein the controller turns the first switch on in response to the sleep recovery button being operated, and
   the processor which is supplied with power turns the second switch on based on the operation time of the sleep recovery button being longer than the threshold value.

6. The printing apparatus according to claim 1, wherein the processor is a main processor of the printing apparatus.

7. A control method of controlling a printing apparatus that includes a printer and a sleep recovery button that receives a user operation, the control method comprising:
   when an auto sleep timer value becomes zero, shifting the printing apparatus to a power saving mode in which power is not supplied to the printer and a processor, but power is supplied to a sleep recovery circuit;
   causing a signal to be detected by the sleep recovery circuit in response to receiving the user operation;
   causing power to be supplied to the processor in response to detecting the signal;
   in a case where an operation time of the sleep recovery button is shorter than a threshold value, shifting the printing apparatus from the power saving mode to a first power mode in which power is not supplied to the printer, and resetting the auto sleep timer value to a default value; and
   in a case where the operation time of the sleep recovery button is longer than a threshold value, shifting the printing apparatus from the power saving mode to a second power mode in which power is supplied to the printer, and resetting the auto sleep timer value to an extended value different from the default value, according to the operation time of the sleep recovery button,
   wherein the operation time of the sleep recovery button includes a depression time of the sleep recovery button.

* * * * *